United States Patent [19]

Durand

[11] Patent Number: 5,130,609

[45] Date of Patent: Jul. 14, 1992

[54] ILLUMINATING DEVICE INCORPORATING GAS-FILLED CHAMBERS

[76] Inventor: Aimé Durand, 47, Bd Poincaré, 66000 Perpignan, France

[21] Appl. No.: 598,659
[22] PCT Filed: Jan. 26, 1990
[86] PCT No.: PCT/FR90/00058
 § 371 Date: Oct. 18, 1990
 § 102(e) Date: Oct. 18, 1990
[87] PCT Pub. No.: WO90/09088
 PCT Pub. Date: Aug. 9, 1990

[30] Foreign Application Priority Data

Jan. 31, 1989 [FR] France ................ 89 01154

[51] Int. Cl.$^5$ .............................................. H05B 37/02
[52] U.S. Cl. ...................... 315/219; 315/206; 315/223; 315/DIG. 7; 331/112
[58] Field of Search ............ 315/219, DIG. 7, 223, 315/226; 331/112

[56] References Cited

U.S. PATENT DOCUMENTS

| | | | |
|---|---|---|---|
| Re. 29,510 | 1/1978 | Hull ........................... | 331/112 X |
| 2,915,710 | 12/1959 | Schiewe et al. ............. | 331/112 |
| 2,982,881 | 5/1961 | Reich ........................... | 315/219 X |
| 3,249,892 | 5/1966 | Van Geen .................... | 331/112 X |
| 3,417,306 | 12/1968 | Knak ........................... | 331/112 |
| 3,448,335 | 6/1969 | Gregory et al. ............. | 331/112 |
| 4,682,082 | 7/1987 | MacAskill et al. .......... | 315/219 |
| 4,700,112 | 10/1987 | Chang .......................... | 315/206 X |

FOREIGN PATENT DOCUMENTS 2176507 11/1973 France .

Primary Examiner—Eugene R. LaRoche
Assistant Examiner—Do Hyun Yll
Attorney, Agent, or Firm—Browdy and Neimark

[57] ABSTRACT

A light source having two potential terminals, a transformer coil having a primary incorporating two windings and a secondary transistor, the first potential terminal being connected to the first winding of the primary, which is connected to the base of the transistor, the collector of which is connected to the second winding of the second terminal, a load capacitor connecting the second winding to the second terminal, a potentiometer connecting the first terminal to the capacitor at the common point between the capacitor and the second winding, a sealed chamber incorporating two electrodes containing a gas, these two electrodes being connected to the winding of the secondary. The invention is advantageously applied in illumination of any type, in industry, advertising, domestic equipment, etc.

10 Claims, 1 Drawing Sheet

ILLUMINATING DEVICE INCORPORATING GAS-FILLED CHAMBERS

BACKGROUND OF THE INVENTION

The present invention relates to light sources, and more particularly to those which produce electro-magnetic energy in the visible range for the purpose of illuminating any element in any field, be it industrial, commercial, advertising, domestic, etc.

There are in existence currently numerous light sources producing an energy in the form of an electromagnetic radiation in the visible range. These sources essentially comprise a closed chamber, generally containing a rare gas such as argon, neon, krypton, etc., or a mixture of these gases, this chamber comprising, within it, electrodes of varying degrees of complexity which pass through its wall towards the exterior via sealed passages. These electrodes are themselves connected to the output terminals of an electronic circuit for generating a supply electric current, this circuit being capable of being supplied from various energy sources. These sources are those supplying an alternating current which may be rectified, or indeed batteries, accumulators or the like supplying direct current directly.

The electronic circuits known at the present time are fairly complex, since they generally necessitate, being based on alternating current, a certain number of sub-assemblies which are, generally, transformers, rectifiers, oscillatory circuits, as well as associated peripheral circuits permitting the supply of electrical pulses for initiating a discharge between the two electrodes situated within the chamber and thus the production, by various phenomena which are known per se, of an emission of electromagnetic waves.

In fact, it is found that the light sources which have been developed up to the present time give relatively good results. However, in spite of all this, they require electronic supply circuits which are very complex, heavy and burdensome and which, furthermore, on account of their design, give rise to a relatively short service life of the chambers. It even happens that these light sources, on account of certain failures of components which participate in their construction, are unable to produce their emission of electromagnetic waves any longer.

SUMMARY OF THE INVENTION

The object of the present invention is to provide a light source of an electromagnetic radiation in the visible range, comprising a minimum of components, capable of operating from a source of alternating as well as direct electrical energy, and permitting the achievement of a service life of these components which is far longer than that which is achieved with the light sources of the same type of the prior art, and especially a light source comprising circuits which are relatively simply and not excessively burdensome, which have a small space requirement and which achieve the ignition thereof instantaneously.

More specifically, the subject of the present invention is a light source characterized in that it comprises:
a supply potential terminal,
a reference potential terminal,
a transformer coil having a primary incorporating at least two first and second windings an a secondary incorporating at least one winding,
a transistor incorporating three first, second and third electrodes,
first means for connection of said supply potential terminal to a first end of said first winding of the primary,
second means for connection of the second end of said first winding of said primary to a first electrode of said transistor,
third means for connection of the second electrode of said transistor to a first end of said second winding of the primary,
a load capacitor,
fourth means for connection of the second end of said second winding of said primary to a terminal of said load capacitor,
fifth means for connection of the other terminal of said load capacitor to said reference potential terminal,
sixth means for connection of the third electrode of said transistor to said reference potential terminal,
resistive means capable of connecting said supply potential terminal to said terminal of said load capacitor which is connected to the second end of the second winding of the primary,
a sealed chamber containing a gas, said chamber comprising two simple output electrodes, and
seventh means for connection of the two output terminals of the two said simple electrodes of the chamber respectively to the two said ends of said secondary winding.

BRIEF DESCRIPTION OF THE DRAWINGS

Further features and advantages of the present invention will become evident in the course of the description which follows, which is given with reference to the accompanying drawing on an illustrative but in no sense limiting basis, in which drawing the single figure represents a diagram of an embodiment of a light source according to the invention.

DETAILED DESCRIPTION OF THE PREFERRED EMBODIMENT

Figure 1:
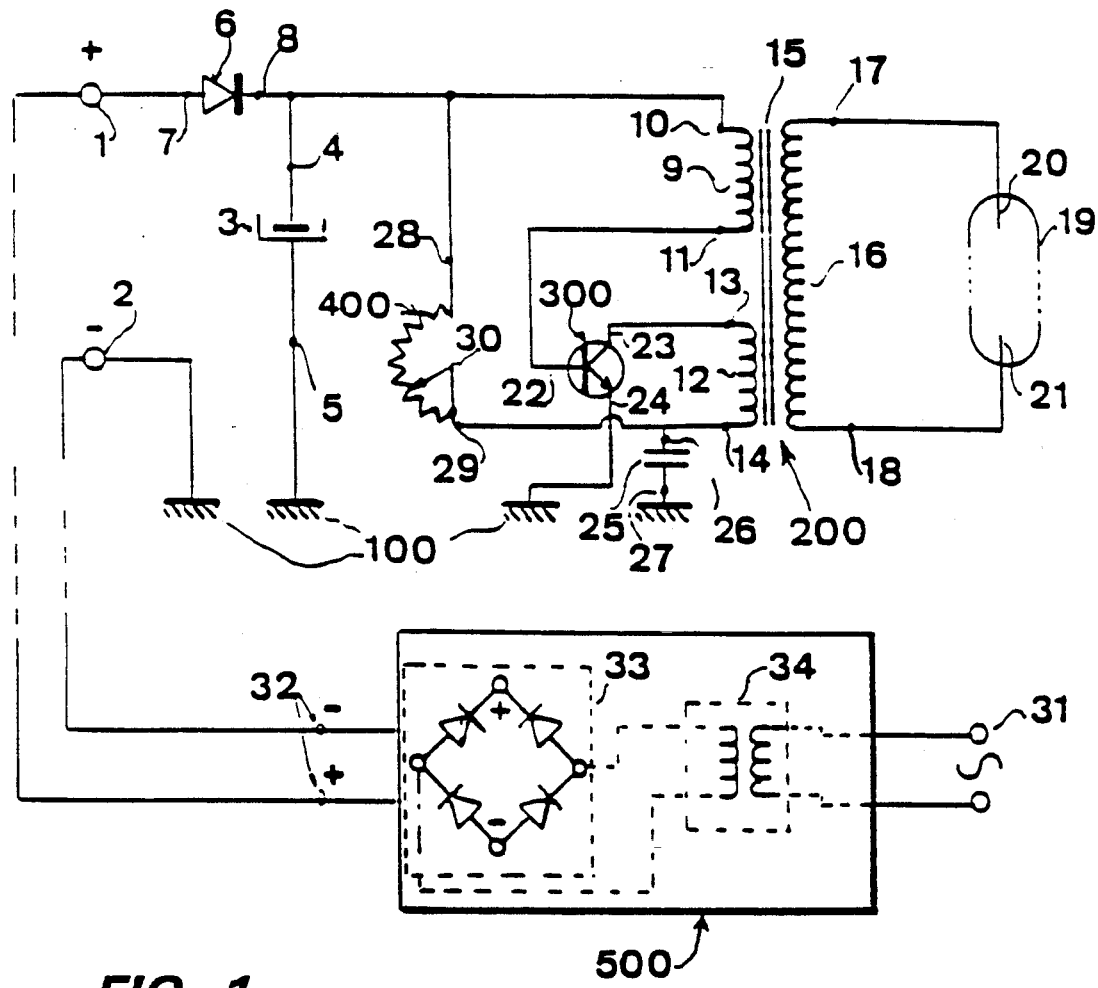

The diagram of the single figure represents an embodiment of a light source according to the invention. This source comprises a supply potential terminal 1 and a reference potential terminal 2, these two terminals being capable of being connected, for example to the two positive and negative terminals 32 of an electrical energy source 500 supplying direct current.

The source further comprises a transformer coil 200 comprising a primary winding incorporating at least two first 9 and second 12 windings and a secondary winding 16, these windings being coupled by a ferrite 15.

It further comprises a transistor 300, for example of the NPN type, having three electrodes which are the base 22, emitter 24 and collector 23 respectively.

In this case, the source comprises connecting means for connecting the supply potential terminal 1 to a first end 10 of the first winding 9 of the primary. In this embodiment, these means are composed of a diode 6, the anode 7 of which is connected to the input terminal 1 and the cathode 8 of which is connected to the point 10 of the winding 9. In the case, for example, of a mistaken reverse connection to the electrical energy source, this diode essentially permits the prevention of an incorrect supply to the transistor 300, which would destroy it.

Connecting means are also provided which permit the connection of the second end 11 of the first winding 9 of the primary to a first electrode 22 of the transistor 300, in this particular case its base. These means are simply composed of an electrical conductor. Third connecting means permit the connection of a second electrode 23, in this particular case the collector of the transistor 300, to a first end 13 of the second winding 12 of the primary. These means are also simply composed of an electrical conductor. The other end 14 of the winding 12 is connected through a load capacitor 25 to the potential reference terminal 2. In this case, this end 14 of the winding 12 is connected by an electrical conductor to a first terminal 26 of the capacitor 25 while the second terminal 27 of this capacitor is connected to the terminal 2, for example through the earth as diagrammatically represented at 100. There are also means for connecting the third electrode 24, in this particular case the emitter of the transistor, to the reference potential terminal 2, for example also by means of the earth 100.

The source further comprises resistive means 400, for example a potentiometer, the variable tap 30 of which is connected by one end 29 of the potentiometer to the first terminal 26 of the load capacitor 25, while its other end 28 is connected to the supply potential terminal 1 by means of the diode 6, while being connected to the cathode 8 of the latter.

The source further comprises a sealed chamber 19, made of a material transparent to the waves in the visible range, for example of glass, containing a gas which is generally a rare gas such as argon, neon, helium or the like. This chamber may further comprise, deposited on its internal surface, a fluorescent product. It is generally of oblong shape and further comprises two simple electrodes 20, 21, for example made of a conductive metal such as copper, which respectively connect the two internal ends of the chamber to the exterior of this chamber, by passing through it via sealed passages. In fact, these two electrodes 20, 21 are connected to the two ends 17, 18 of the secondary winding 16, for example by electrical conductors.

In an advantageous embodiment, the source comprises a filtering capacitor 3, for example an electrolytic condenser, which by its two output terminals 4 and 5 connects the supply potential terminal 1 to the reference potential terminal 2, this capacitor permitting the filtering of the direct current to eliminate any possible frequency signals which may be superposed on this direct current.

Finally, it is clearly specified that the electrical energy source 500 may be composed, for example, of a battery, an accumulator, etc. However, this source may likewise be composed of an electrical circuit of the rectifying type supplied by a source of alternating current 31 which is currently available. Such a rectifying circuit is known per se and will not be fully described here, except to state that it generally comprises at least one transformer 34 and, for example, a diode bridge 33.

The light source described hereinabove operates in the following manner:

When the two terminals 1 and 2 are supplied with a direct current, the capacitor 25 charges and discharges via the transistor 300 between its two electrodes 23, 24. In the course of the discharging, the potential induced in the secondary 16 at its terminals 17, 18 permits the initiation of a discharge in the as contained in the chambers 19. However, this voltage also induces a reaction voltage in the first winding 9, which permits the blocking of the transistors by its base voltage. The capacitor may therefore charge again. As the transformer is no longer saturated, it permits the release of the blocking voltage of the transistor and thus the reinitiation of the discharging of the capacitor 25 as described hereinabove.

This cycle of phenomena is repeated in the rhythm of the value of the charging time of the capacitor through the resistance of the potentiometer. Thus, a cycle of successive discharges takes place at a frequency which is of the order of 30,000 Hertz. This frequency value, or a value which is close to it, has been determined experimentally as giving a good result. In fact, this value gives a good sequence of discharges in the gas of the chamber, that is to say that which permits the human eye to see a continuous light, but also the production, in the gas, of an instantaneous initiation of the luminous arc, without the aid of associated means and, furthermore, with gas pressures which may be relatively low; this leads to a very low consumption of electricity.

To all the advantages mentioned hereinabove must be added the fact that the light source has a very long service life and that it is not necessary to undertake frequent changes of the chamber, including such changes together with the gas.

I claim:

1. A light source driver circuit comprising:
   a DC power supply comprising a first and a second potential terminals,
   a transformer coil comprising a first and a second primary windings and a secondary winding for connection of a light source,
   a capacitor having a first electrode connected to a first end of said second primary winding and a second electrode connected in common with an emitter of a transistor and to said first potential terminal of said DC power supply, the collector of said transistor being connected to a second end of said second primary winding,
   said second potential terminal of said DC power supply is connected through a resistance to said first electrode of said capacitor and to said first end of said second primary winding and through said first primary winding to the base of said transistor.

2. The light source driver circuit according to claim 1, further comprising a diode on one of said potential terminals of said DC power supply.

3. The light source driver circuit according to claim 1, wherein said resistance is a potentiometer.

4. The light source driver circuit according to claim 1, further comprising a filtering capacitor connected between said first and said second potential terminal of said DC power supply.

5. The light source driver circuit according to claim 1, further comprising a diode at said second potential terminal of said DC power supply and a filtering capacitor connected to the cathode of said diode and to said first potential terminal of aid DC power supply.

6. The light source driver circuit according to claim 1, wherein said transistor is a NPN type transistor.

7. The light source driver circuit according to claim 1, wherein an oscillator comprising said transformer coil and transistor and capacitor works at a frequency of 30 kHz.

8. The light source driver circuit according to claim 1, wherein said light source comprises a visible light source connected between a first and a second end of said secondary winding.

9. The light source driver circuit according to claim 8, wherein said visible light source comprises a chamber enclosing a rare gas chosen from the group of neon, argon, and helium.

10. The light source driver circuit according to claim 8, wherein said light source is fluorescent lamp.

* * * * *